(12) United States Patent
Anderson et al.

(10) Patent No.: US 6,810,850 B2
(45) Date of Patent: Nov. 2, 2004

(54) APPARATUS AND CONTROL FOR VARIABLE EXHAUST BRAKE

(75) Inventors: Derek Anderson, Abbotsford (CA); Mark A. Israel, Amherst, MA (US); Robert B. Price, Manchester, CT (US)

(73) Assignee: Jenara Enterprises Ltd., Surrey (CA)

( * ) Notice: Subject to any disclaimer, the term of this patent is extended or adjusted under 35 U.S.C. 154(b) by 51 days.

(21) Appl. No.: 10/125,566

(22) Filed: Apr. 19, 2002

(65) Prior Publication Data

US 2003/0019470 A1 Jan. 30, 2003

Related U.S. Application Data

(60) Provisional application No. 60/284,929, filed on Apr. 20, 2001.

(51) Int. Cl.[7] ............................................. F02D 9/06
(52) U.S. Cl. ..................... 123/323; 60/324; 60/284; 123/142.5 R
(58) Field of Search ................. 123/142.5 R, 323; 60/284, 324

(56) References Cited

U.S. PATENT DOCUMENTS

| | | | |
|---|---|---|---|
| 3,042,153 A | 7/1962 | Alfieri | 188/99 |
| 3,941,113 A | 3/1976 | Baguelin | 123/179 |
| 4,220,008 A | 9/1980 | Wilber et al. | 60/602 |
| 4,556,027 A | 12/1985 | Harris | 123/323 |
| 4,557,233 A | 12/1985 | Joppig et al. | 123/323 |
| 4,669,435 A | 6/1987 | Furusawa et al. | 123/323 |
| 4,819,590 A * | 4/1989 | Ban et al. | 123/323 |
| 4,835,963 A | 6/1989 | Hardy | 60/274 |
| 4,875,455 A | 10/1989 | Hashimoto et al. | 123/568 |
| 5,079,921 A | 1/1992 | McCandless et al. | 60/602 |
| 5,113,652 A | 5/1992 | Baines et al. | 60/288 |
| 5,193,657 A | 3/1993 | Iizuka | 192/1.23 |
| 5,218,818 A * | 6/1993 | Ahmann | 123/323 |
| 5,255,650 A | 10/1993 | Faletti | |
| 5,362,285 A | 11/1994 | Sano et al. | 477/92 |
| 5,394,901 A | 3/1995 | Thompson | 137/513.3 |
| 5,638,926 A | 6/1997 | McCrickard | 188/273 |
| 5,676,110 A | 10/1997 | Meneely | 123/323 |
| 5,967,115 A * | 10/1999 | Konopka et al. | 123/323 |
| 6,020,652 A | 2/2000 | Daudel et al. | 290/45 |
| 6,085,524 A | 7/2000 | Persson | 60/602 |
| 6,085,722 A | 7/2000 | Zimmermann | |
| 6,092,371 A | 7/2000 | Feucht et al. | 60/602 |
| 6,109,027 A | 8/2000 | Schaefer | 60/324 |
| 6,152,853 A | 11/2000 | Banks, III | 477/186 |
| 6,170,474 B1 | 1/2001 | Israel | 123/568.14 |
| 6,179,096 B1 | 1/2001 | Kinerson et al. | 188/154 |
| 6,273,059 B1 | 8/2001 | Wagner | 123/323 |

* cited by examiner

Primary Examiner—Erick Solis
(74) Attorney, Agent, or Firm—Liniak, Berenato & White, LLC

(57) ABSTRACT

A controlled exhaust brake for an engine comprises an exhaust restrictor located in an exhaust system downstream of an exhaust manifold of an engine. An actuator operably associated with the restrictor adjusts the restrictor. A pressure sensor operably associated with the exhaust manifold senses pressure in the exhaust manifold. A controller determines a set pressure in the exhaust manifold correlated with speed of the engine. The controller is in communication with the pressure sensor and the actuator, and causes adjustment of the restrictor in order to achieve and maintain the set pressure in the exhaust manifold.

50 Claims, 16 Drawing Sheets

APPARATUS AND CONTROL FOR VARIABLE EXHAUST BRAKE

CROSS REFERENCE TO RELATED APPLICATIONS AND CLAIM TO PRIORITY

This is a nonprovisional application of provisional application, Ser. No. 60/284,929, filed Apr. 20, 2001, by Anderson et al., entitled Apparatus and Control for Variable Exhaust Brake, the disclosure of which is herein incorporated by reference, and priority of which is claimed.

BACKGROUND OF THE INVENTION

1. Field of the Invention

The disclosed invention is a controlled exhaust brake for an engine and method for maintaining a set pressure in the exhaust manifold. The claimed invention provides for a controlled exhaust brake having a controller that adaptively responds to changes in exhaust pressure relative to a set pressure. The controlled exhaust brake enhances engine retarding significantly. Exhaust pressure for optimum braking power is maintained over the full range of engine speed. Driver input is not required to maintain a high exhaust pressure. In addition, the claimed invention generates a backpressure load suitable for warming a cold engine after starting.

2. Description of Prior Art

It is well known in the art that the regulation of exhaust pressure in internal combustion engines assists in warming up the engine, and also provides for engine retarding power. It is also known in the art that engines operate with the greatest fuel efficiency and operating characteristics when an optimum operating temperature has been reached for the engine. When an engine operates below its optimum temperature during starting or warm-up of the engine, emissions of unburned fuel increase.

Light and medium duty diesel engines generally rely on exhaust brakes for engine retarding since a compression release type brake can easily develop loads that are too great for the smaller valve trains. The exhaust brake mechanism includes a restrictor element mounted in the exhaust system. Generally, exhaust gas generated by pistons of an engine is released into the exhaust system during an exhaust cycle. When the restrictor element is closed, backpressure resists the exit of gases during the exhaust cycle and retards the motion of the pistons, thereby providing an engine braking function. This system provides less braking power than a compression release engine brake, but also at less cost. Partial closing of the restrictor provides a light load against which the engine must work, causing the engine to warm up faster than it would without such restriction. This is particularly useful after starting a cold engine.

The amount of exhaust gas may vary depending on operating conditions, such as engine speed. When an engine is operated at lower engine speeds, less exhaust gas is available for providing backpressure, or engine retarding. When an engine is operated at higher speeds, more exhaust gas is available for providing backpressure. Engine speed may also vary due to load fluctuations on the vehicle engine, such as inclines and declines. In order to compensate for these fluctuations, some prior art systems use bypass valves, or waste-gates, to provide a means of controlling the exhaust gas flow. Other systems rely on driver input to adjust the position of the restrictor element. Repeated gear shifting has also been used to keep the engine speed and exhaust pressure high.

In many conventional exhaust brake systems, a certain amount of leakage by the exhaust restrictor is desirable so that when the restrictor is fully closed exhaust pressure will not rise above the system limit. This is generally accomplished by creating substantial clearance around the restrictor or by actually putting a hole through the exhaust restrictor element. In addition to leakage by the restrictor, in many systems the restriction is optimized to generate maximum allowable backpressure at rated engine speed. However, retarding power of exhaust brakes generally falls off sharply as engine speed decreases. Therefore, such conventional systems provide exhaust restriction that is too small to be effective at lower engine speeds given exhaust pressure decreases with engine speed. As such, they do not have the flexibility to optimize retarding power over the full engine speed range. Performance is improved considerably if exhaust pressure is maintained over the full speed range for engine retarding.

Attempts have been made to develop a system for optimizing the retarding power yield of exhaust brakes over the full speed range. In some systems, restriction is controlled by mechanical controls with hydraulic or pneumatic actuators. However, these systems can only control to a single exhaust set pressure. In addition, if the single set pressure is the maximum pressure allowed by the engine, the exhaust pressure will most likely exceed this limit pressure before it is brought back below the maximum pressure. Assured maximum pressure protection requires the set pressure to be less than the maximum allowed pressure.

In other systems, pressure relief mechanisms limit the maximum exhaust pressure. This approach may work at low engine speeds, but may hinder the ability to produce pressure at high engine speeds after the pressure relief has been activated. Therefore, such systems fail to optimize the retarding power for the full applicable engine speed range. Retarding power optimization with engine speed requires the set pressure to be variable with engine speed.

Another approach provides for a system that controls exhaust pressure to a maximum level permitted for the engine. In such a system, a signal pressure from the vehicle's main air tanks is ported to a plunger. The plunger then extends a dish-valve to seal against the oncoming exhaust gas. The pressure balance between the area of the plunger and the dish-valve determines the resultant exhaust restriction.

One problem with past systems, as described above, is the inability to operate an exhaust brake at high exhaust pressure due to exhaust valve float. Valve float is the opening of the valve by means of gas pressure applied to the back face. Excessive valve float can cause high valve seating velocities, reduce the time the valve is seated and associated heat transfer and may cause contact of the valve with the piston. Further attempts to overcome this problem have been made, wherein a second valve is closed in the intake system. The pressure is thereby equalized across the valves and the valves are biased closed by the valve springs. A pressure relief valve is then placed in the system to establish a maximum exhaust pressure. The resultant system is overly complex, having various additional components.

Other systems use an external bypass to the main exhaust brake valve to create a variable exhaust brake. Exhaust gas pressure acts on a bypass valve and against a spring force resisting movement of the valve. Once the design limit for exhaust pressure is reached, the bypass opens. As engine speed increases, the bypass valve may open further to maintain pressure at the upper limit. Again, the resultant system is overly complex.

Therefore, utilization of bypass circuits to control exhaust pressure by directing a portion of the exhaust gas away from the main exhaust flow may partially control exhaust pressure, but at the cost of adding components and complexity to the system. Furthermore, many bypass circuits do not accurately control exhaust pressure given such circuits rely on control of biasing force of a plunger within the bypass circuit for regulating exhaust flow. Exhaust flow is regulated by determining the appropriate biasing force necessary for retarding in the bypass circuit. Adjustment of the bypass circuit plunger is based on this biasing force, instead of on the actual exhaust pressure. Therefore, exhaust pressure is controlled indirectly, which may lead to greater fluctuations of the desired optimal exhaust pressure, especially when engine speed fluctuates.

Even if retarding power is achieved over a range of engine speeds, the exhaust brake can stall the engine below a certain engine speed. In order to compensate for this problem, some systems provide for an electrical switch to monitor throttle position and a shift sensor in an automatic transmission. In such systems, exhaust braking is applied only when sufficiently high servo hydraulic pressure is attained after a downshift, thus preventing the engine from stalling. However, driver input is generally required in such systems.

Driver input has also been incorporated to establish dual use of the exhaust brake, functioning as both an engine retarder and an engine warm-up valve. For engine warm-up, the exhaust restrictor is only closed partially to provide a light load against which the engine can work. Heat energy is retained and the engine warms up faster. Other systems have used driver input to command restriction adjustment for turbocharger wastegating or variable geometry turbine settings. These vary the degree of cylinder charge and thereby the exhaust braking effort. Again, however, driver input is required in order to actuate such exhaust restriction, which may lead to less accurate or poorly timed adjustment.

Vehicle operators are not willing to run the engines at their rated speed to take advantage of maximum exhaust brake power. Therefore, there is a need for greater retarding power to be provided by the exhaust brake at engine speeds below rated. A simple orifice, designed to prevent over-pressure at high engine speed, does not provide the high exhaust pressure required at the lower engine speeds. Prior art has addressed the need to increase exhaust brake performance, but falls short of providing the flexibility to optimize retarding power over the full range of engine operating conditions.

It is apparent from the disclosures of the prior art that there remains a significant need for a practical method of and apparatus for regulating exhaust brake pressure in order to provide maximum effectiveness at all engine speeds. A practical system must control to a set pressure that is less than the maximum allowed pressure to avoid exceeding the upper limit. Also, a practical system requires the set pressure to be variable with engine speed so that retarding power can be optimized at the lower speeds. The present invention provides for a controlled exhaust brake that overcomes the deficiencies described above. In addition, the controlled exhaust brake of the present invention provides for minimum or no leakage when the restrictor is in the closed position, given the restrictor relies on computer control to maintain system exhaust pressure and prevent over-pressure.

SUMMARY OF THE INVENTION

A controlled exhaust brake for an engine comprises an exhaust restrictor located in an exhaust system downstream of an exhaust manifold of an engine. An actuator operably associated with the restrictor adjusts the restrictor. A pressure sensor upstream of the restrictor senses pressure in the exhaust system. A controller is in communication with the pressure sensor and the actuator, and determines a set pressure in the exhaust manifold correlated with speed of the engine. The controller then causes adjustment of the restrictor in order to achieve and maintain the set pressure in the exhaust manifold.

A temperature sensor may also be located upstream of the restrictor. The temperature sensor senses temperature upstream of the restrictor. The controller, also in communication with the temperature sensor, maintains a set temperature in the exhaust manifold. The set temperature is less than a maximum allowable temperature.

The claimed invention also relates to a controlled exhaust brake for an engine including a bypass valve operably associated with an exhaust manifold of an exhaust system of an engine. An exhaust restrictor located in the exhaust system downstream of the exhaust manifold is operably associated with the bypass valve. A first actuator is operably associated with the restrictor for opening or closing the restrictor so that when the restrictor is closed, an exhaust flow is channeled to the bypass valve. A second actuator is operably associated with the bypass valve for adjusting the bypass valve. A pressure sensor senses pressure in the exhaust manifold. A controller is in communication with the pressure sensor, the first actuator, and the second actuator, and determines a set pressure in the exhaust manifold correlated with speed of the engine. The controller then causes the restrictor to close, and causes adjustment of the bypass valve in order to maintain a set pressure in the exhaust manifold.

The claimed invention also relates to a method of regulating exhaust pressure in an engine, including the following steps: providing an exhaust restrictor located in an exhaust system downstream of an exhaust manifold of an engine; sensing pressure in the exhaust manifold; determining a set pressure in the exhaust manifold correlated with speed of the engine by a controller; and maintaining the set pressure in the exhaust manifold by causing adjustment of the restrictor by the controller.

The controlled exhaust brake of the claimed invention maintains a set pressure in an exhaust system in an engine, even with variable engine conditions. The claimed invention responds to changing pressure conditions, and thereby maintains the set pressure over the full engine speed range by adjusting the restrictor in the exhaust system. Control of the exhaust restrictor provides the ability to maintain an exhaust pressure required for optimal engine function. The restrictor may be placed at any point in the exhaust system, including upstream, downstream or integral to a turbocharger in a turbocharged engine system.

In the claimed invention, exhaust pressure is measured and compared to a desired set pressure, which is electronically stored in a controller. If the measured exhaust pressure equals the desired set pressure, the position of the exhaust restrictor is maintained. If the measured exhaust pressure does not equal the desired set pressure, the exhaust restrictor is adjusted, either opened or closed. This adjustment is controlled by the controller, and brings the exhaust pressure closer to the set pressure. The controller monitors both current pressure and past trends in pressure in order to determine the restrictor adjustment necessary to achieve the desired set pressure.

Specifically, a pressure signal is taken on the upstream side of the restrictor and is read by the controller at a pressure transducer. The controller is in communication with an actuator, which causes adjustment of the restrictor. The controller may also operate a solenoid mechanism to modulate the signal through a solenoid valve to the actuator. The actuator may be operated by air or oil, or may be electromagnetic. If power is lost to the controller and/or solenoid mechanism, the actuator moves the restrictor to the fully open position for failsafe operation.

As opposed to prior systems, simplicity of the claimed invention is maintained, given only a single exhaust restrictor is used in the exhaust system. Standard actuator hardware may be used to adjust the restrictor. The signal source to the actuator is modulated based on the prevailing exhaust pressure alone, or exhaust pressure and temperature together. Sensor input and stored target data constrain a control algorithm utilized by the controller to drive the system to converge for optimized exhaust brake performance at all applicable engine speeds.

It is to be understood that both the forgoing general description and the following detailed description are exemplary and explanatory only. The accompanying drawings, incorporated herein by reference, illustrate certain embodiments of the invention, and together with the detailed description serve to explain the principles of the present invention.

DETAILED DESCRIPTION OF THE INVENTION

Figure 1:
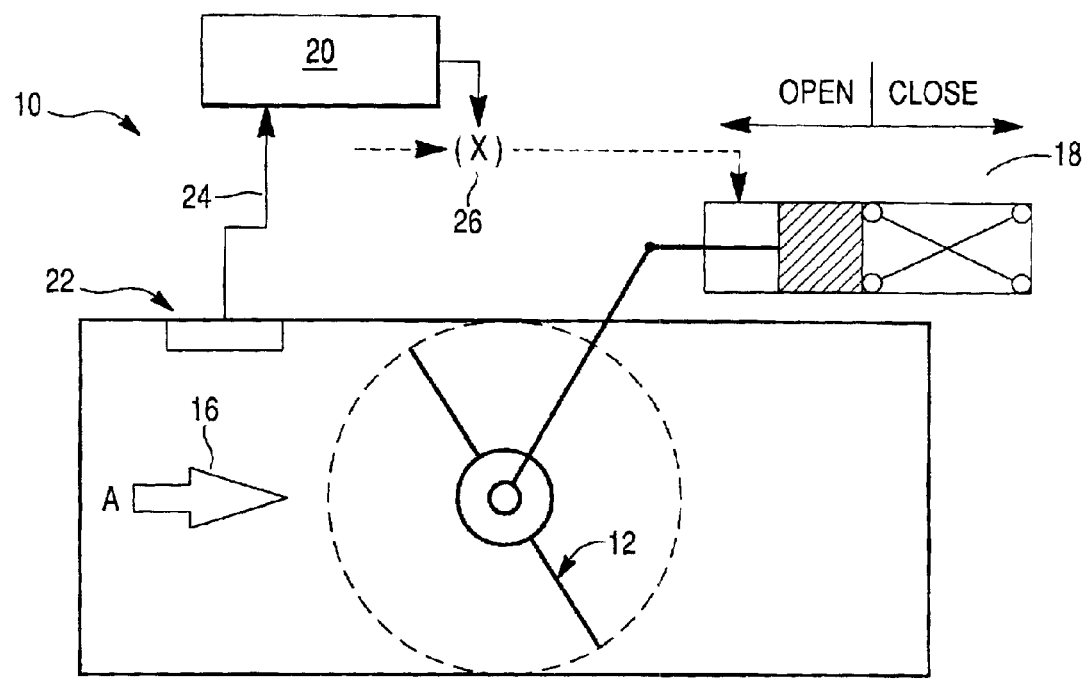
FIG. 1 is a schematic diagram of a controlled exhaust brake according to the present invention.

With reference to the drawings, FIG. 1 depicts a controlled exhaust brake 10 according to the present invention. Controlled exhaust brake 10 includes a restrictor 12 located in the exhaust system of an engine downstream of an exhaust manifold of the engine. Restrictor 12 may be a butterfly valve, a gate valve, a variable geometry element of a turbine of a variable geometry turbocharger, or any other moveable element that may be placed in the exhaust system.

The direction of gas exhaust flow 16 is illustrated by arrow A in FIG. 1. Restrictor 12 may be fully open, fully closed, or partially open. The pressure in the exhaust manifold (not shown in FIG. 1) may therefore be regulated depending upon the position of restrictor 12. If restrictor 12 is fully open, exhaust flow 16 is unrestricted by restrictor 12. Similarly, if restrictor 12 is fully closed, no exhaust flow 16 leaks through restrictor 12. Restrictor 12 is adjusted by an actuator 18, which in turn is controlled by a controller 20. A pressure sensor 22 measures the pressure of the exhaust gas upstream of restrictor 12, and transmits a pressure signal 24 to controller 20.

Controller 20 determines the pressure in upstream of restrictor 12 based upon pressure signal 24 received from pressure sensor 22. Controller 20 has a table of set pressure values, which are installed in controller 20. The set pressure values are electronically stored in controller 20 as a function of engine speed. As such, the set pressure may vary depending on engine speed. A maximum allowable pressure is also stored in controller 20. Controller 20 determines the appropriate set pressure value from the stored table based on engine speed. Optimal engine retardation may therefore be achieved without creating a deleterious pressure in the engine exhaust system (i.e. avoiding damage to the engine or stalling of the engine). In addition, the maximum set pressure allowable by controller 20 is less than the maximum allowed pressure by the engine, in order to provide pressure protection and avoid engine damage.

In one embodiment of the invention, controller 20 communicates with a solenoid valve 26, as best shown in FIG. 1. Solenoid valve 26 actuates actuator 18, thereby causing adjustment of restrictor 12. In this way, exhaust pressure in the exhaust manifold may be regulated in order to maintain the set pressure, as determined by controller 20. In addition, actuator 18 automatically causes restrictor 12 to open so that exhaust flow 16 is substantially unhindered by restrictor 12 should communication fail between actuator 18 and controller 20, thereby providing failsafe operation.

Figure 2:
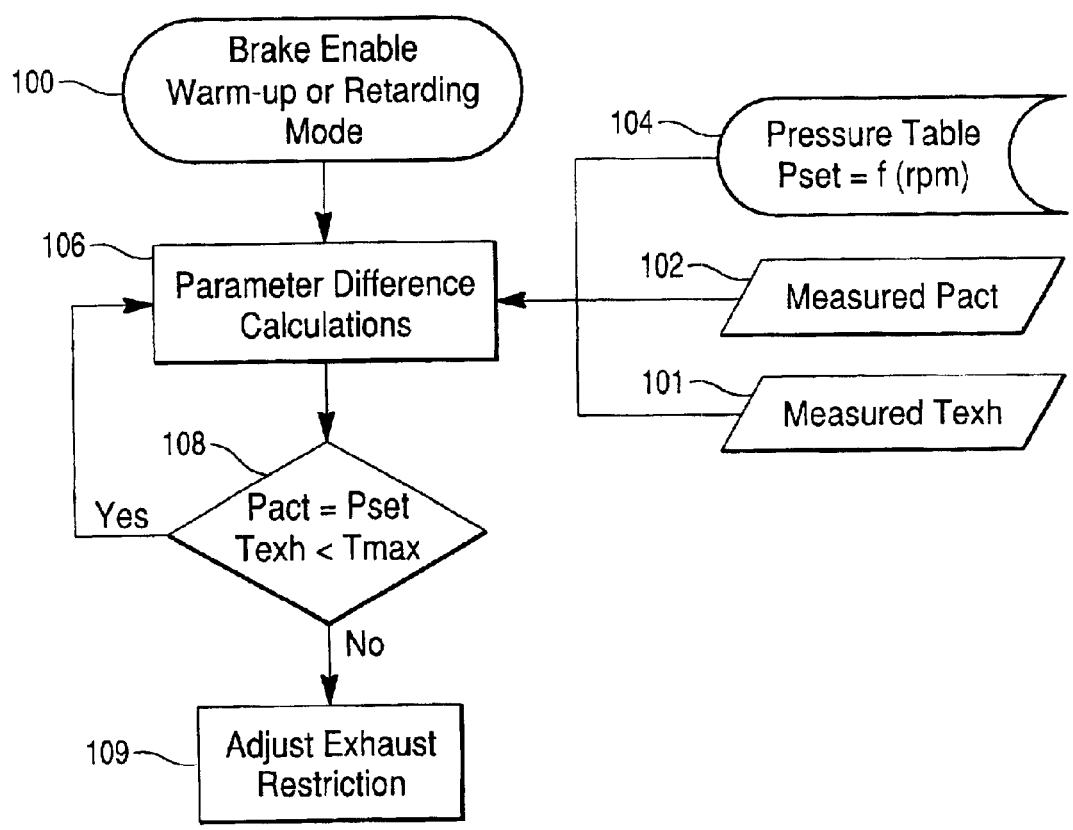
FIG. 2 is a schematic diagram of the exhaust pressure control process according to the claimed invention.

The exhaust pressure control process is best shown in FIG. 2. FIG. 2 also shows features of a second embodiment of the present invention that measures exhaust pressure and exhaust temperature, discussed below. Controller 20 receives a pressure signal 24 from pressure sensor 22 at 102. Controller 20 also retrieves the set pressure table from its memory at 104. Controller 20 determines the actual exhaust pressure (Pact) as measured by pressure sensor 22, as well as the corresponding set pressure (Pset) correlating to engine speed at 106. Controller 20 then compares the actual exhaust pressure value to the set exhaust pressure value to determine if the two values are equal at 108. If the actual exhaust pressure does not equal the set exhaust pressure, controller 20 causes actuator 18 to adjust restrictor 12 until the measured pressure is within a predetermined pressure range at 109. Controller 20 receives continuous pressure signals 24 from pressure sensor 22 at 102, and adjustment of restrictor 12 continues until the actual exhaust pressure is within the acceptable predetermined range. When the actual exhaust pressure is within the predetermined range, the position of restrictor 12 is maintained, and the exhaust control process may be repeated after a specified time delay at 106.

Controlled exhaust brake 10 may be operated in either warm-up or retarding mode, as best shown in FIG. 2. The vehicle operator selects the desired mode by use of a switch or other selection device known in the art at 100. If the operator does not make any mode selection, the retarding mode may be designated as the default mode by controller 20. If warm-up mode is selected, controlled exhaust brake 10 is adjusted to a predetermined position by controller 20 so that backpressure is provided to warm the engine after starting. The predetermined position provides a light load for warming the engine after starting. This warm-up mode continues until a predetermined parameter value is reached. This parameter may be exhaust temperature or engine coolant temperature.

Figure 3:
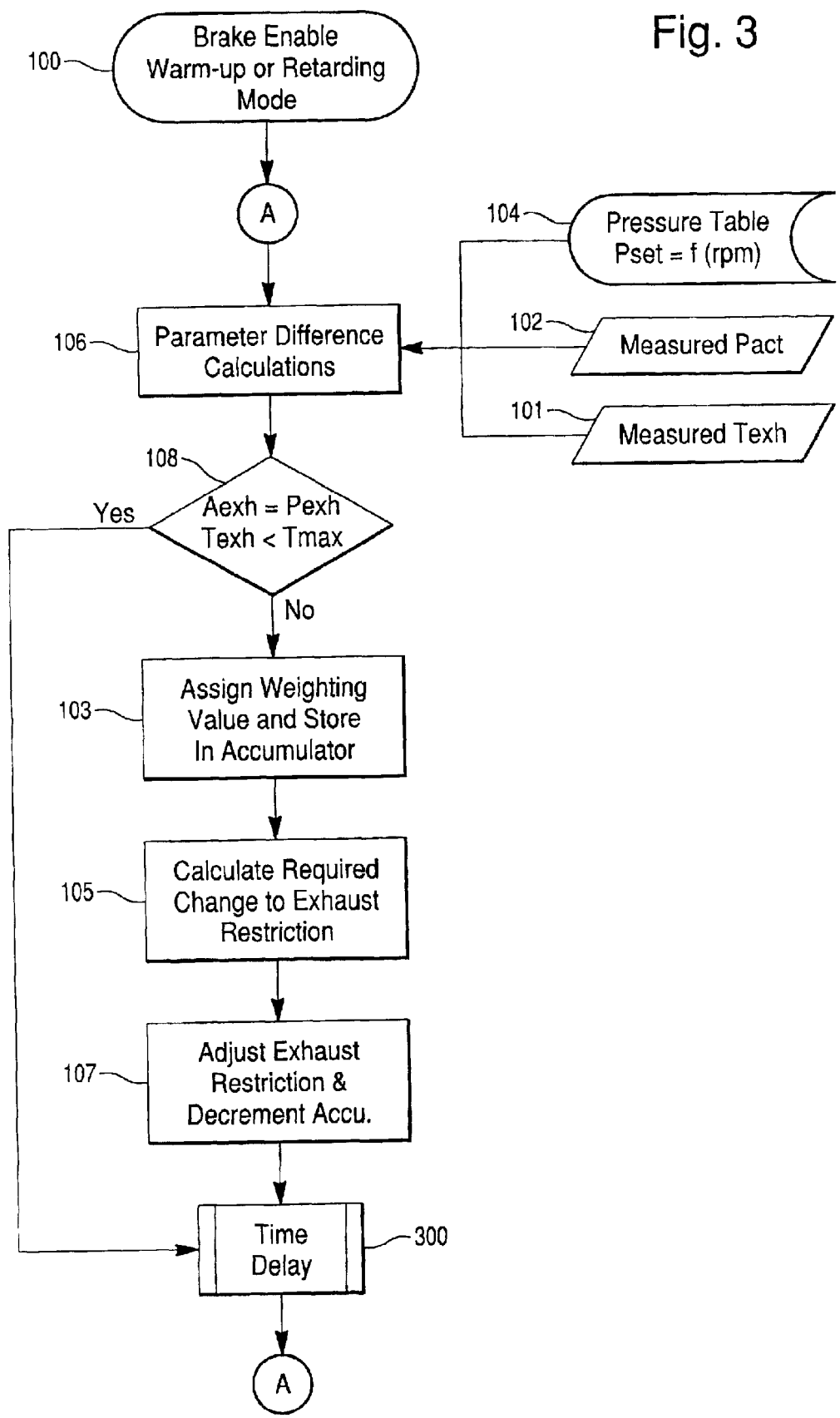
FIG. 3 is a schematic diagram of the exhaust pressure control algorithm according to the claimed invention.

FIG. 3 is a flowchart of the control process algorithm. A vehicle operator selects the desired mode, either warm-up or retarding, at 100. The selected mode is communicated to controller 20 at A. Pressure sensor 22 measures the actual exhaust pressure upstream of restrictor 12, which is then communicated to controller 20 by pressure signal 24 at 102. The mode selection invokes a corresponding set pressure table stored in controller 20 at 104, wherein the set pressure is stored as a function of engine speed. This permits fine adjustment at lower engine speeds to maintain higher exhaust pressure. Further, it is used as a flag for low speed cut-off protection to prevent stalling of the engine, by assigning a low set pressure below a minimum engine speed.

Controller 20 determines the actual exhaust pressure (Pact) as measured by pressure sensor 22, as well as the corresponding set pressure (Pset) correlating to engine speed at 106. Controller 20 then compares the actual exhaust pressure value to the set exhaust pressure value to determine if the two values are equal at 108. If the corresponding set pressure value equals the actual exhaust pressure at 108, the position of restrictor 12 is maintained at 300. The process is delayed for a predetermined period of time at 300, after which the algorithm is re-initiated at 106.

If the actual exhaust pressure does not equal the set pressure value, the difference is proportionately weighted and accumulated in a memory by controller 20 at 103. The weighting and accumulation algorithm is best described with reference to a first embodiment of the claimed invention outlined in FIG. 4, explained below. The accumulated value is functionally equivalent to a mathematical integral performed upon the exhaust backpressure. Controller 20 also measures the rate of change of the actual exhaust pressure at 103. The rate of change is functionally equivalent to the differential of the actual exhaust backpressure. A value for the rate of change is also weighted, and accumulated in the memory by controller 20 at 103. Controller 20 determines a total accumulated value, and causes adjustment of restrictor 12 by movement of actuator 18, based on the total accumulated value at 105. The accumulated value is then reduced by an amount proportional to the amount of movement in actuator 18 at 107. Actuator 18 is moved an amount corresponding to the accumulated value determined at 105, thereby causing adjustment of restrictor 12 at 107. This accumulation and adjustment process is repeated after a predetermined time delay, and re-initiates at 106, until the brake is deactivated.

Figure 4:
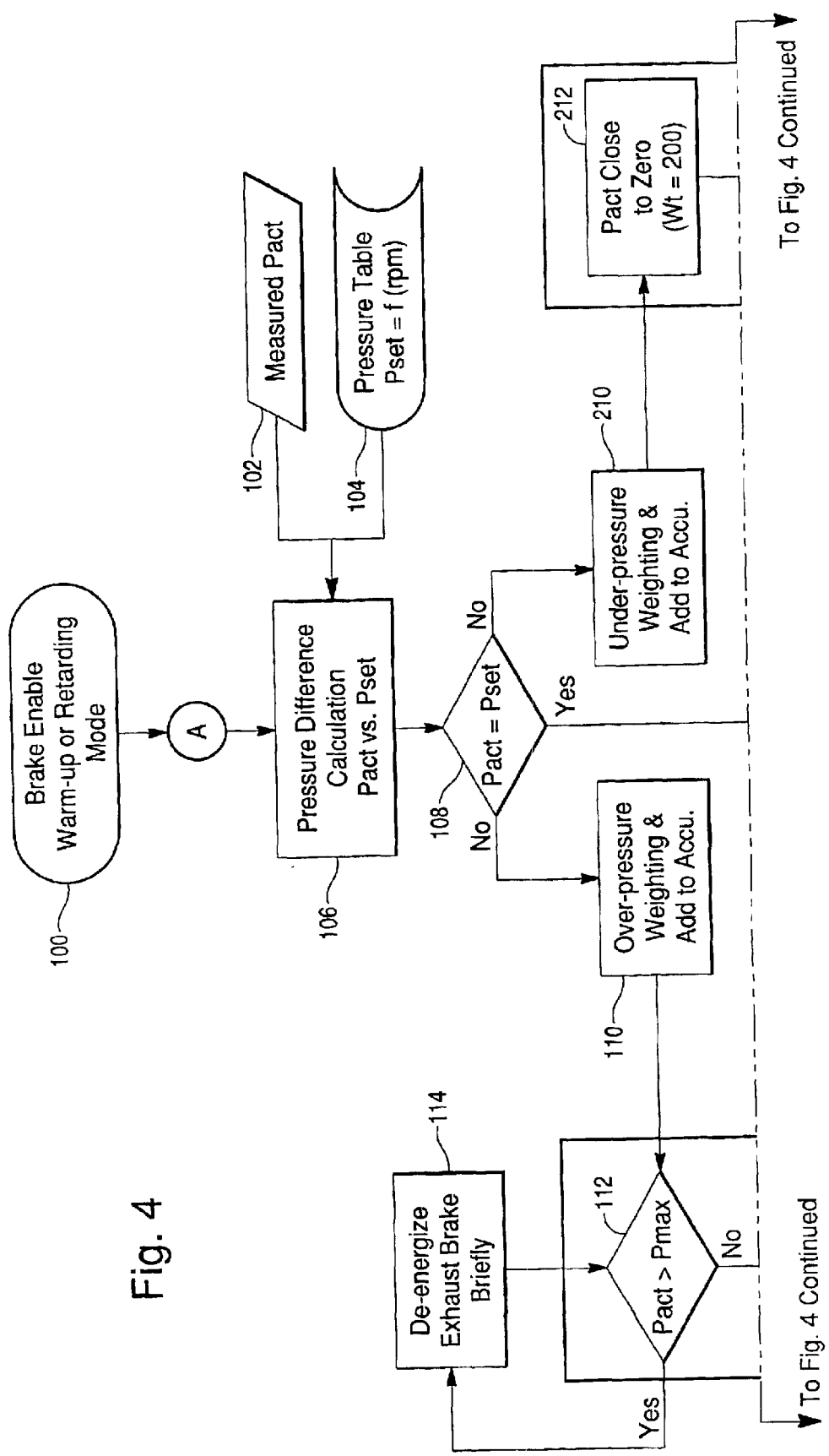
FIG. 4 is a flowchart of one embodiment of the exhaust pressure control algorithm according to the present invention.
Figure 4:
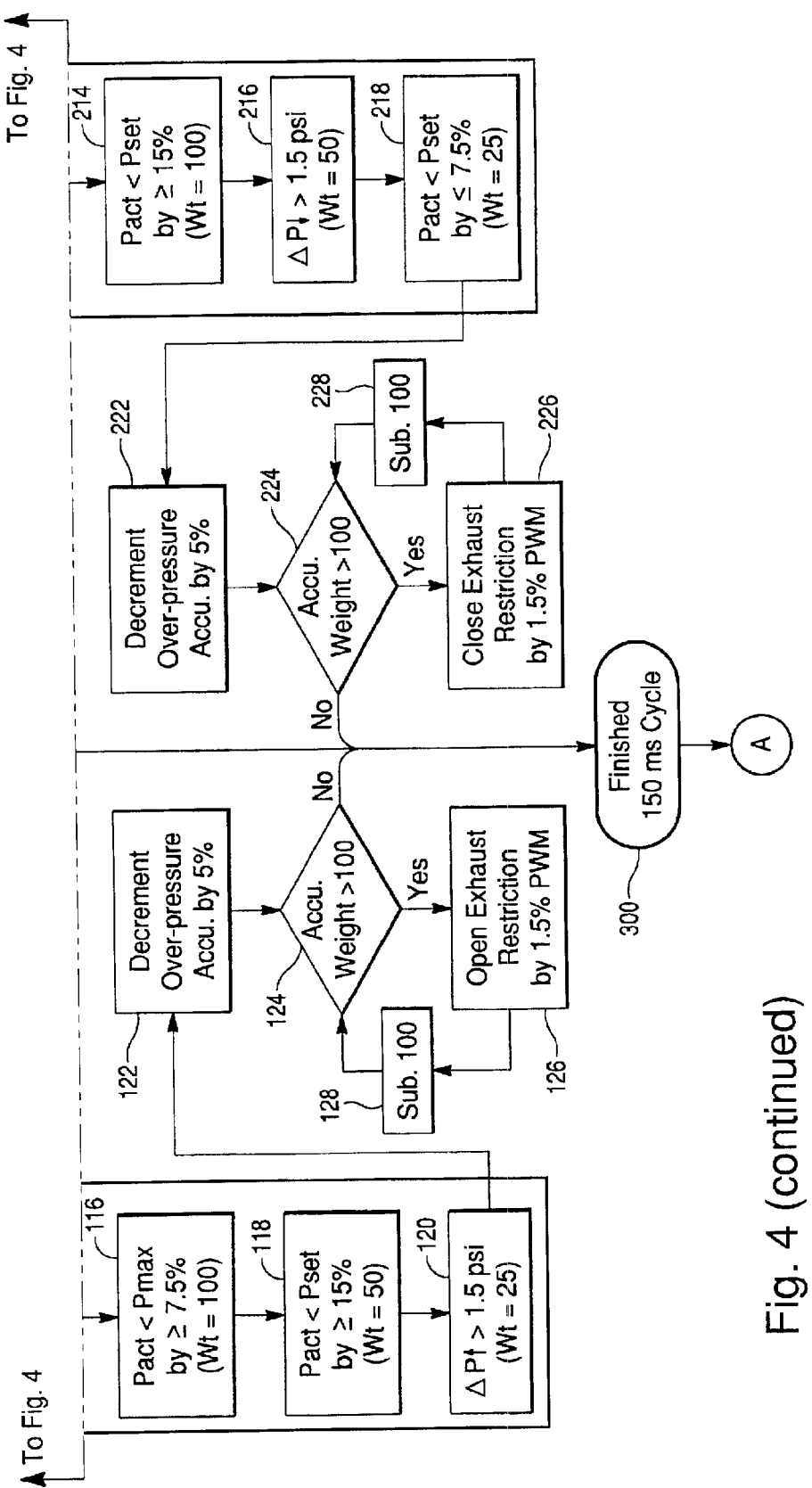

FIG. 4 is a flowchart of one embodiment of the control algorithm. Steps 100–108 correspond to identically numbered steps as explained above in FIGS. 2 and 3. Referring to FIG. 4, if the actual exhaust pressure is more than the corresponding set pressure value, controller 20 determines whether adjustment of restrictor 12 is necessary by assigning weightings to the actual exhaust pressure measured at 110 (Over-pressure weighting). Specifically, controller 20 first determines if the actual exhaust pressure is greater than a maximum allowable pressure at 112. The maximum allowable pressure value is electronically stored in controller 20. If the actual exhaust pressure is greater than the maximum allowable pressure, controlled exhaust brake 10 is de-energized and restrictor 12 is opened to relieve the actual exhaust pressure at 114. In order to prevent damage to the engine, controller 20 compares the actual exhaust pressure to the maximum allowable pressure at a very high rate in order to determine if controlled exhaust brake 10 should be de-energized. Controlled exhaust brake 10 is not re-energized until the actual exhaust pressure is less than the maximum allowable pressure.

Once the actual exhaust pressure is less than the maximum allowable pressure, controller 20 determines whether the actual exhaust pressure is less than the maximum allowable pressure by at 7.5% or less at 116. If the actual exhaust pressure is within 7.5% of the maximum allowable pressure, controller 20 assigns a weight of 100 to this determination at 116. If the actual exhaust pressure is less than the maximum allowable pressure by more than 7.5%, no weight is assigned from this comparison. (Note that the weights assigned are arbitrary values, but are relative to each other in the over-pressure weighting algorithm used to determine restrictor adjustment).

Next, controller 20 determines whether the actual exhaust pressure is more than the set exhaust pressure by 15% or more at 118. If the actual exhaust pressure is greater than the set exhaust pressure by 15% or more, controller 20 assigns a weight of 50 to this comparison at 118: If not, no weight is assigned from this comparison. The weights assigned are cumulative. For example, if controller 20 determined the actual exhaust pressure to be less than the maximum allowable pressure by 7.5% at 116 (assigning a weight of 100), and more than the set exhaust pressure by 15% at 118 (assigning a weight of 50), the over-pressure cumulative weight assigned would be 150 (with additional weights potentially added to this value as the algorithm proceeds).

When the actual exhaust pressure is greater than the corresponding set pressure (as determined at 118), controller 20 also determines if the change in actual exhaust pressure is increasing at a rate greater than 1.5 psi in a cycle at 120. If the change in actual exhaust pressure is more than 1.5 psi, controller 20 assigns a weight of 25, which is again cumulative with any weights assigned by previous comparisons at 116 and 118.

After controller 20 has made the above comparisons and weight assignments, the total accumulated weight is decreased by 5% at 122. The resultant weight, following the 5% decrease, is compared to a weight of 100 by controller 20 at 124. If the accumulated weight is greater than 100, controller 20 causes restrictor 12 to open 1.5% pulse width modulation (PWM) of the total wave at 126. Controller 20 then subtracts 100 from the accumulated weight at 128, and this weight is again compared to 100. If it is again greater than 100, controller 20 causes restrictor 12 to again open another 1.5% PWM, and controller 20 again subtracts 100 from the weight following this second restrictor 12 adjustment. This process continues, as best shown in FIG. 4 at 124–128, until an accumulated weight value of less than 100 is achieved.

When the accumulated weight is less than 100 at 124, restrictor 12 is not adjusted and the over-pressure algorithm is complete. Thus, the position of restrictor 12 is maintained at 300. However, the actual exhaust pressure is again compared to the corresponding set pressure value (retrieved from the pressure table) every 150 milliseconds, and the above algorithm is re-initiated at 106.

If the actual exhaust pressure is less than the corresponding set pressure value, a similar weighting system is implemented by controller 20 as described above at 210 (Under-pressure weighting). Controller 20 first determines if there is a very low actual exhaust pressure that is close to zero. If the actual exhaust pressure is close to zero, a weight of 200 is assigned to this determination at 212. Controller 20 next determines if the actual exhaust pressure is less than the corresponding set pressure by 15% or more. If yes, controller 20 assigns a weight of 100 at 214. If the actual exhaust pressure is less than the set exhaust pressure, controller 20 also determines if the change in actual exhaust pressure is decreasing at a rate greater than 1.5 psi in a cycle at 216. If the change in actual exhaust pressure is decreasing at a rate greater than 1.5 psi, controller 20 assigns a weight of 50 at 216. Controller 20 then compares the actual exhaust pressure to the set exhaust pressure at 218. If the actual exhaust pressure is less than the set exhaust pressure by 7.5% or less, controller 20 assigns a weight of 25.

The accumulated weight for the under-pressure weighting is then decreased by 5% at 222. The resultant weight is compared to a weight of 100 by controller 20 at 224. If the accumulated weight is greater than 100, controller 20 causes restrictor 12 to close 1.5% PWM at 226. Controller 20 then subtracts 100 from the accumulated weight at 228, and this weight is again compared to a weight of 100 at 224. The cycle continues for under-pressure weight just as described above for over-pressure weight (124–128). Similarly, this process continues until an accumulated weight value of less than 100 is achieved, at which time the position of restrictor 12 is maintained at 300. The above control process is re-initiated at 106 after 150 milliseconds have elapsed.

Figure 5:
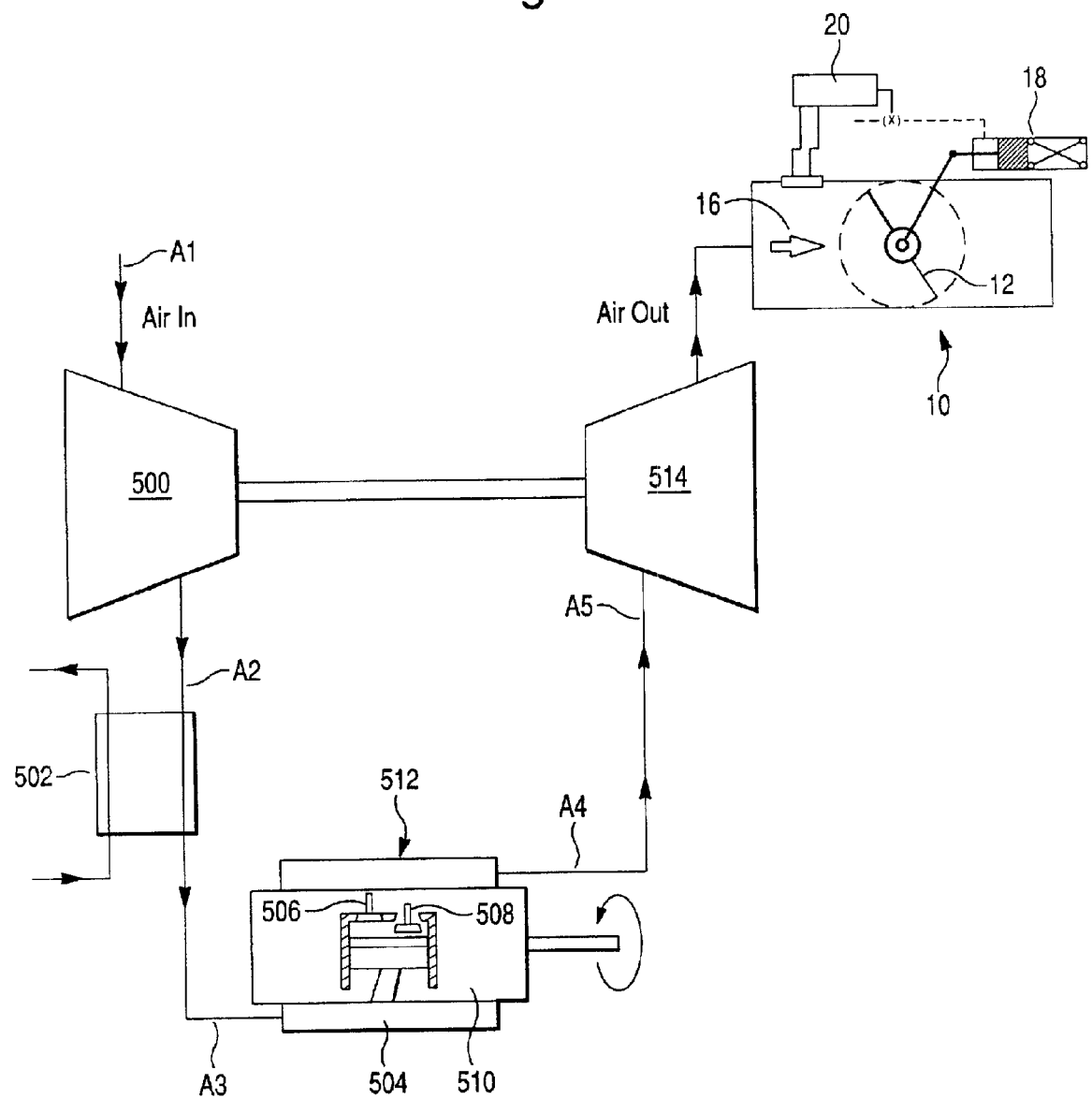
FIG. 5 is a schematic diagram of a controlled exhaust brake according to the present invention mounted downstream of a turbine on a turbocharged engine.
Figure 7:
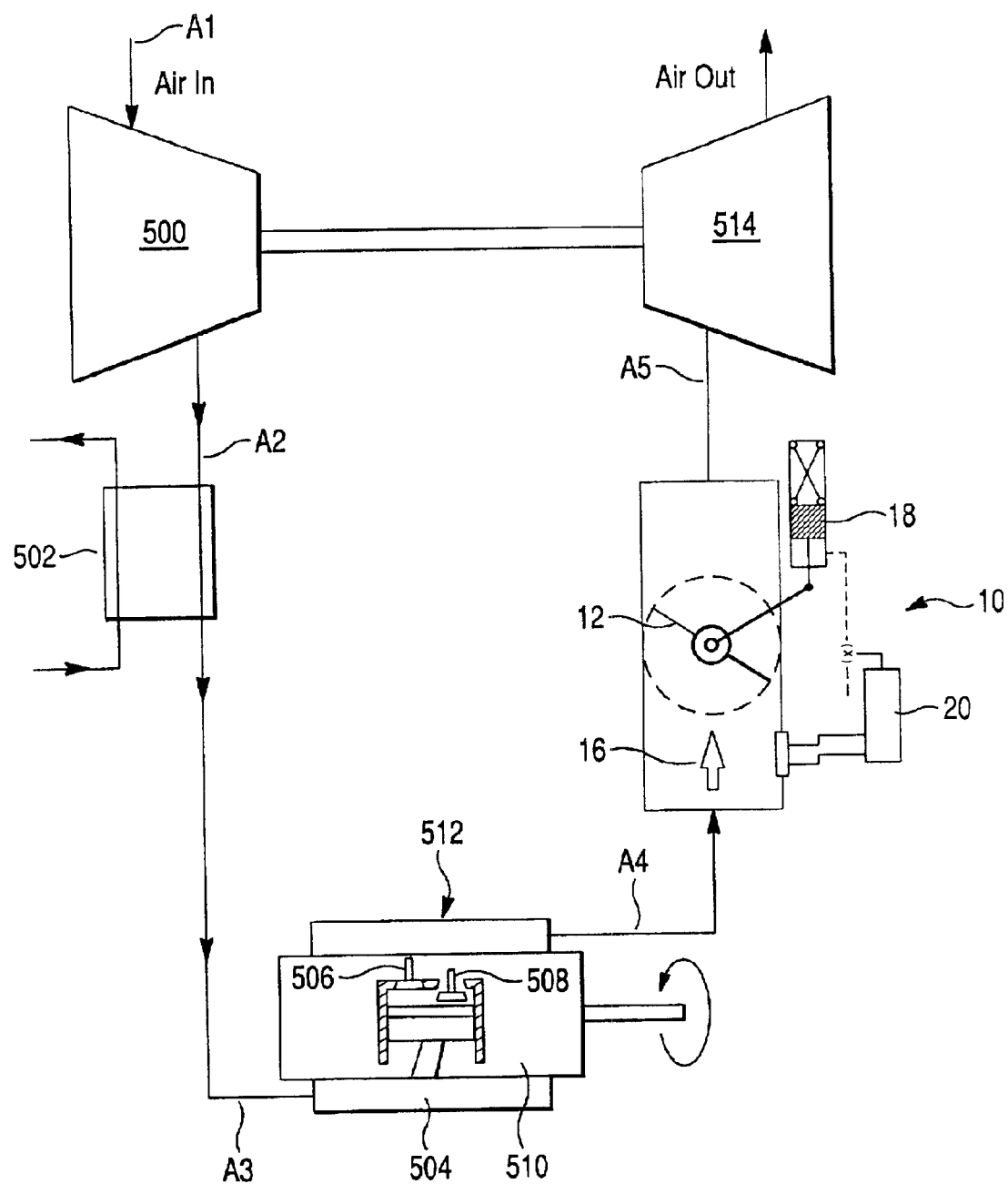
FIG. 7 is a schematic diagram of a controlled exhaust brake according to the present invention mounted upstream of a turbine on a turbocharged engine.

As best shown in FIGS. 5 and 7, controlled exhaust brake 10 may be mounted at various positions in an engine's exhaust system. On an engine with a turbocharger, controlled exhaust brake 10 may be installed either downstream or upstream of the turbine. When mounted downstream of the turbine, the exhaust gas is cooler from expansion and the impact on the exposed components is less severe. An installation upstream of the turbine may be beneficial by providing a pressure difference that maintains the turbocharger speed, and thereby provides fresh air to the engine via the turbocharger compressor. Installation of the controlled exhaust brake upstream of the turbocharger requires a design and materials that can withstand a relatively high temperature.

FIG. 5 is a schematic diagram of controlled exhaust brake 10 mounted downstream of a turbine 514 on an engine with a turbocharger. Exhaust flow 16 through controlled exhaust brake 10 is relatively cool from its expansion through turbine 514. As such, this mounting is a conventional placement for controlled exhaust brake 10. As shown in FIG. 5, air enters a compressor 500 of a turbocharger at A1, and subsequently passes to the internal combustion engine by way of intercooler 502 at A2. Airflow is directed to an intake manifold 504 of cylinder 510 at A3, which includes an intake valve 506 and exhaust valve 508. Exhaust from the cylinder 510 is released by exhaust valve 508 and into exhaust manifold 512 at A4. Exhaust flow 16 in exhaust manifold 512 is channeled to turbine 514, and proceeds to turbine 514 at A5. Exhaust flow 16 exits turbine 514 and continues to controlled exhaust brake 10, downstream of turbine 514 as shown in FIG. 5. Exhaust flow 16 may then be controlled by controlled exhaust brake 10 as explained above.

Figure 6:
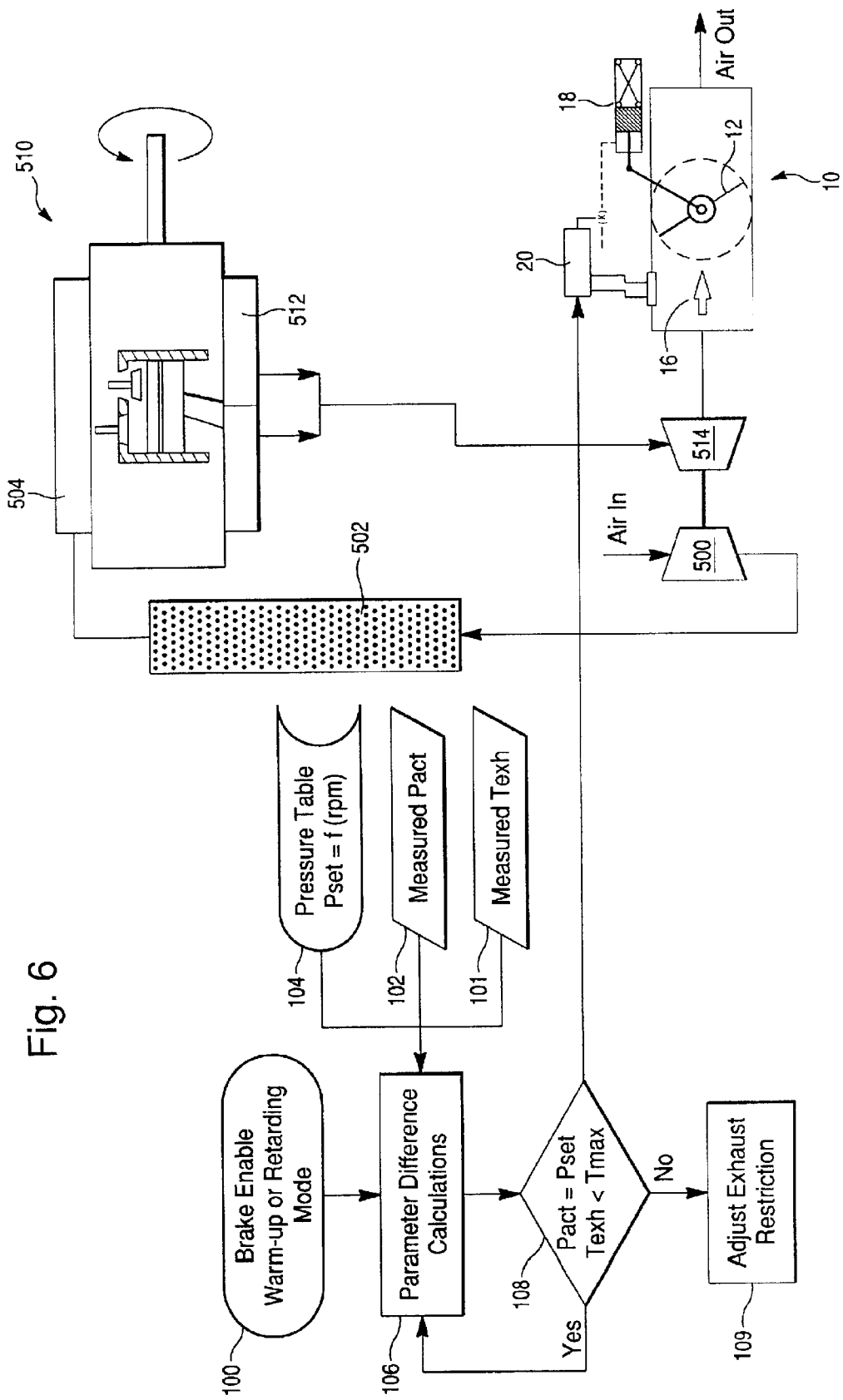
FIG. 6 is a schematic diagram of the controlled exhaust brake mounted downstream of a turbine on a turbocharged engine, and the exhaust pressure control process.

FIG. 6 provides a schematic diagram of controlled exhaust brake 10 mounted downstream of the turbine on an engine with a turbocharger, as shown in FIG. 5, along with the exhaust control process outlined in FIG. 2.

As best shown in FIG. 7, controlled exhaust brake 10 may also be mounted upstream of turbine 514 on an engine with a turbocharger. In this position, the passing gas is relatively hot, coming directly from engine cylinder 510. However, the pressure difference is maintained across turbine 514. With the turbocharger rotating at a faster speed, more fresh air is provided to cylinder 510. The influx of fresh air can keep the system exhaust temperature down. Moreover, the increased mass in cylinder 510 requires greater compression work and leads to greater engine retarding power by controlled exhaust brake 10.

Figure 8:
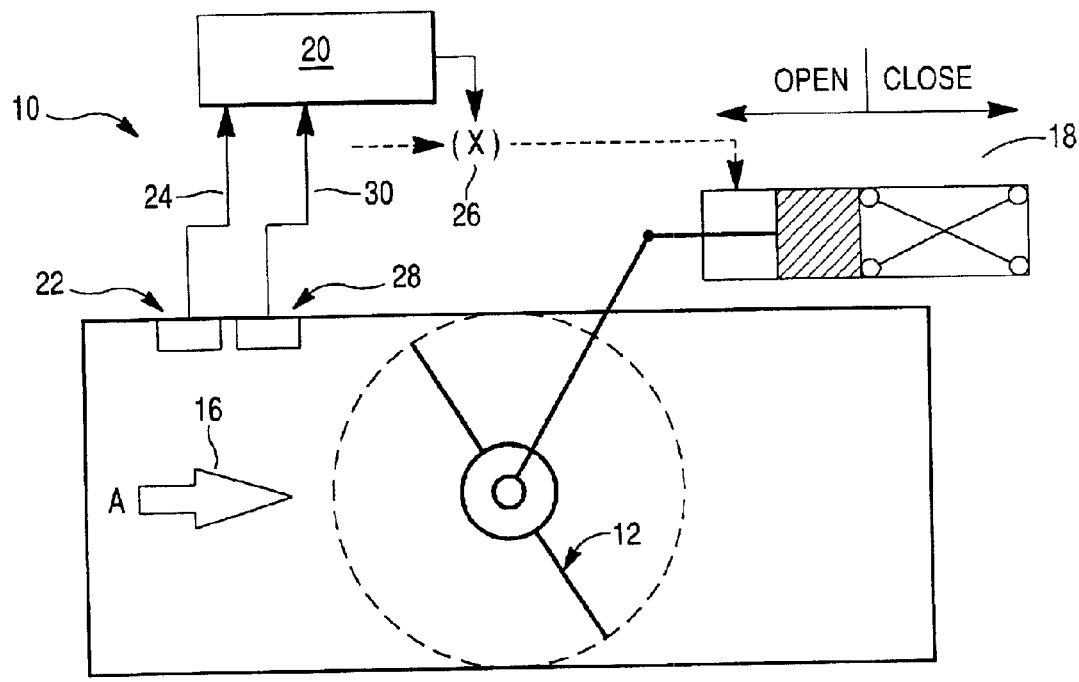
FIG. 8 is a schematic diagram of a second embodiment of a controlled exhaust brake according to the present invention.

FIG. 8 is a schematic diagram of a second embodiment of the present invention. Descriptions of identical components of controlled exhaust brake 10 according to the second embodiment described above will not be repeated hereafter. As best shown in FIG. 8, controlled exhaust brake 10 may also include a temperature sensor 28, which measures the temperature of exhaust flow 16 upstream of restrictor 12. Temperature sensor 28 then transmits a temperature signal 30 to controller 20. Controller 20 determines the temperature of exhaust flow 16 in exhaust manifold 512 based on temperature signal 30.

As noted above, FIG. 2 is a schematic diagram of the exhaust pressure control process including exhaust temperature measurements. The temperature of exhaust flow 16 is important in retarding systems, particularly where both an exhaust brake and a compression release brake are used. Such a system can produce very hot exhaust temperatures, particularly at high engine speeds. Engine retarding performance is optimized at temperatures below a maximum set temperature. Engine damage and poor retarding performance may result if exhaust temperatures exceed the maximum set temperature.

As best shown in FIG. 2, temperature of exhaust flow 16 is measured by temperature sensor 28 at 101, and communicated to controller 20 via temperature signal 30. Controller 20 compares the measured temperature to a maximum set temperature at 108. The maximum set temperature is electronically stored in controller 20. If the measured temperature is less than the maximum set temperature, the position of restrictor 12 is maintained, and the exhaust control process may be repeated after a specified time delay at 106. If the measured temperature is greater than the maximum set temperature, controller 20 causes restrictor 12 to open at 109. Controller 20 receives continuous temperature signals 30 from temperature sensor 28 at 101. Therefore, restrictor 12 is maintained in an open position until the measured temperature is less than the maximum set temperature at 108.

Figure 9:
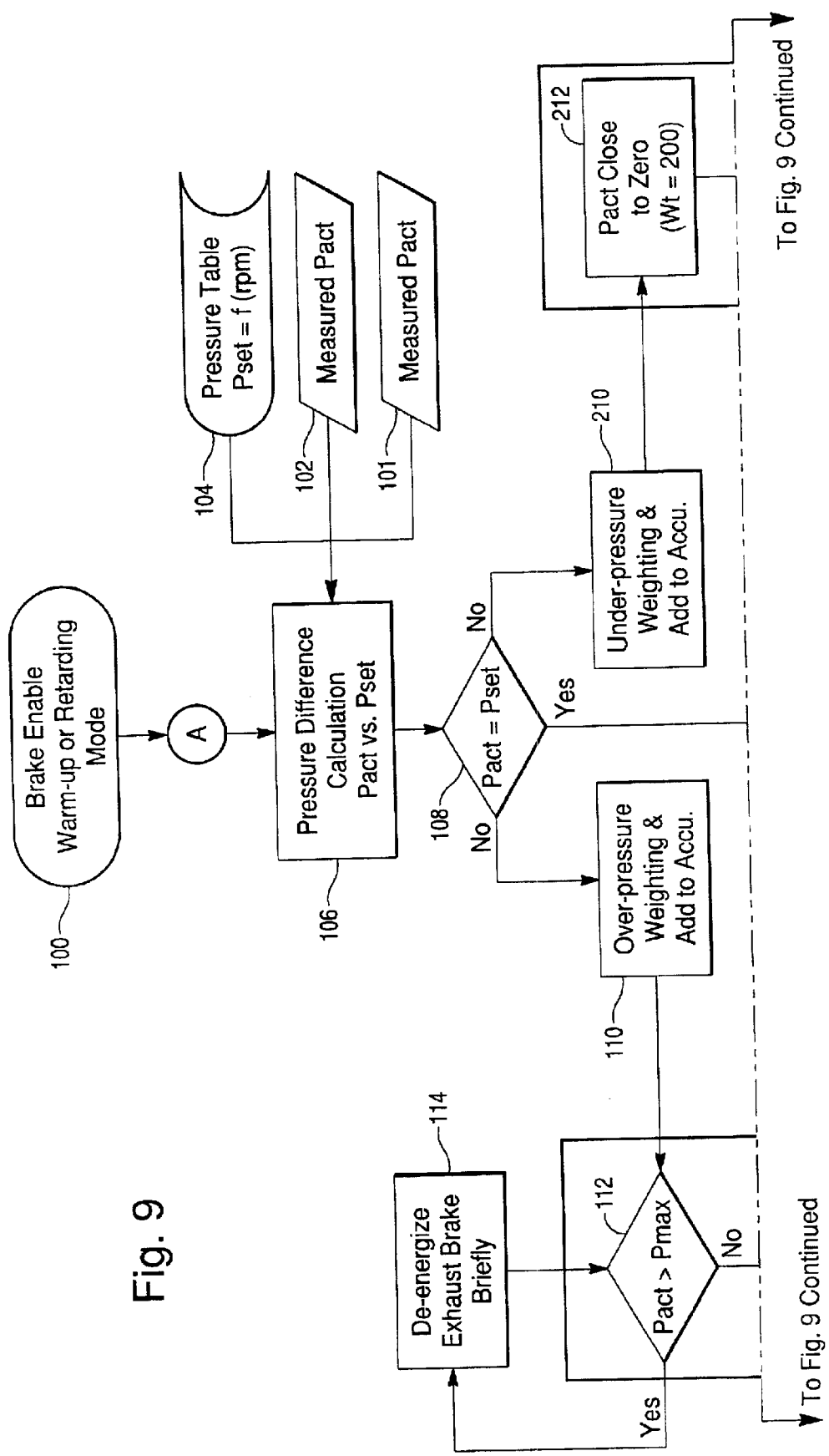
FIG. 9 is a flowchart of second embodiment of the exhaust pressure control algorithm according to the present invention.
Figure 9:
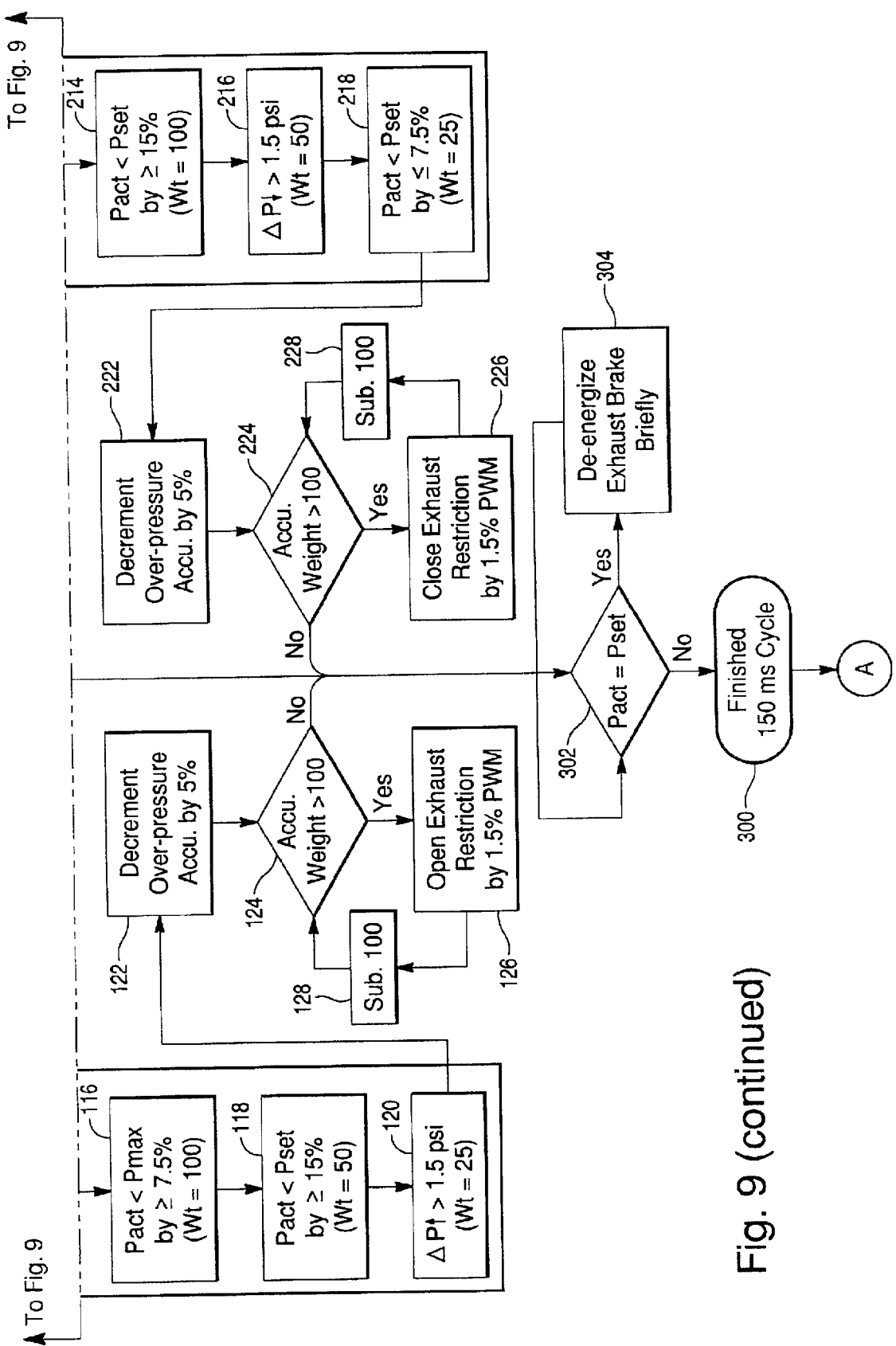

A flowchart of the control algorithm process including temperature measurements is best shown in FIG. 9. The control algorithm process shown in FIG. 9 contains many identical steps, which are outlined above in conjunction with FIG. 4. Identical steps relating to adjustment of restrictor 12 following over-pressure weighting or under-pressure weighting will not be repeated hereafter.

As best shown in FIG. 9, temperature of exhaust flow 16 is measured by temperature sensor 28 and communicated to controller 20 at 101. A maximum set temperature is electronically stored in controller 20. Following either overpressure or under-pressure restrictor 12 adjustments, or a determination by controller 20 that the actual exhaust pressure equals the corresponding set exhaust pressure, controller 20 compares the measured temperature to the maximum set temperature at 302. If the measured temperature is greater than the maximum set temperature at 302, the controlled exhaust brake 10 is deactivated at 304, since exhaust temperature may be maintained at a lower exhaust pressure. Controller 20 again compares the measured temperature to the maximum set temperature after the controlled exhaust brake 10 has been deactivated for a predetermined amount of time. For example, this predetermined amount of time may be 1.0 millisecond. If the measured temperature is not greater than the maximum set temperature at 302, the position of restrictor 12 is maintained at 300. Similar to FIG. 4, the control process is re-initiated at 106 after 150 milliseconds have elapsed.

Figure 10:
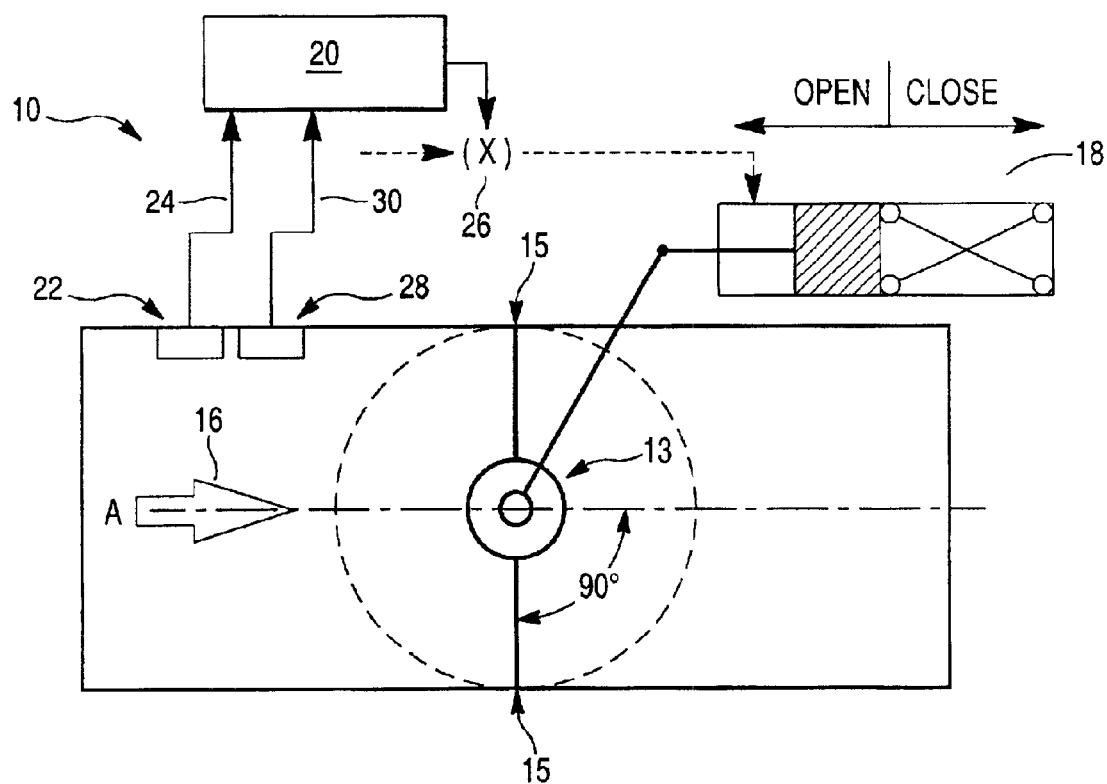
FIG. 10 is a schematic diagram of a third embodiment of a controlled exhaust brake according to the present invention.

FIG. 10 is a schematic diagram of a third embodiment of the claimed invention, which includes a 90-degree closure butterfly valve 13 as the restriction element in the exhaust system, downstream from exhaust manifold 512. Exhaust flow 16 through butterfly valve 13 increases slowly at first, when starting from the closed position. As butterfly valve 13 opens, exhaust flow 16 increases at a faster rate. The closure position of butterfly valve 13 is at a position that is 90 degrees to exhaust flow 16. As such, if butterfly valve 13 is fully closed at the 90-degree position, the clearance around its perimeter 15 is used as a seal. Control of exhaust flow 16 is made with finer resolution from the 90-degree closed position of butterfly valve 13, since the area of exhaust flow 16 increases at the slowest rate.

Figure 11:
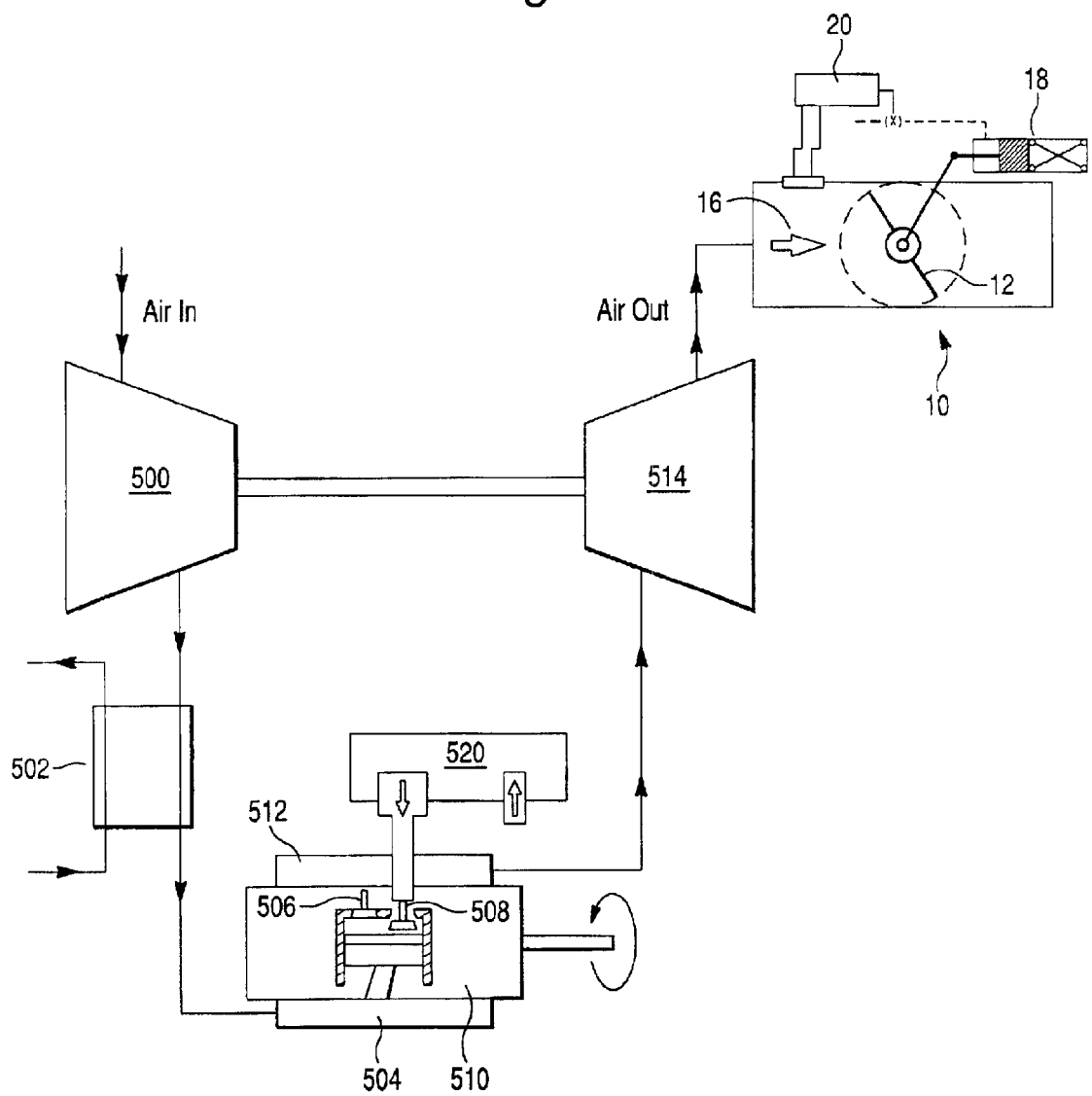
FIG. 11 is a schematic diagram of a turbocharged engine having a controlled exhaust brake mounted downstream of both a turbine and a compression release brake.

In addition to various mounting positions for controlled exhaust brake 10, the claimed invention may also be installed for various applications. FIG. 11 is a schematic diagram of a first application of the present invention, wherein controlled exhaust brake 10 is working in conjunction with a compression release engine brake 520, which controls exhaust valve 508 for engine retarding. Compression release engine brake 520 may be either a type that holds the cylinder charge until late in the compression stroke before releasing the charge, or a type that bleeds the cylinder charge over a greater portion of the compression stroke. As best shown in FIG. 11, controlled exhaust brake 10 is mounted downstream of turbine 514. However, it may also be mounted upstream of turbine 514 (as best shown in FIG. 7). Controlled exhaust brake 10 therefore supplements the engine retarding power of compression release engine brake 520.

Figure 12:
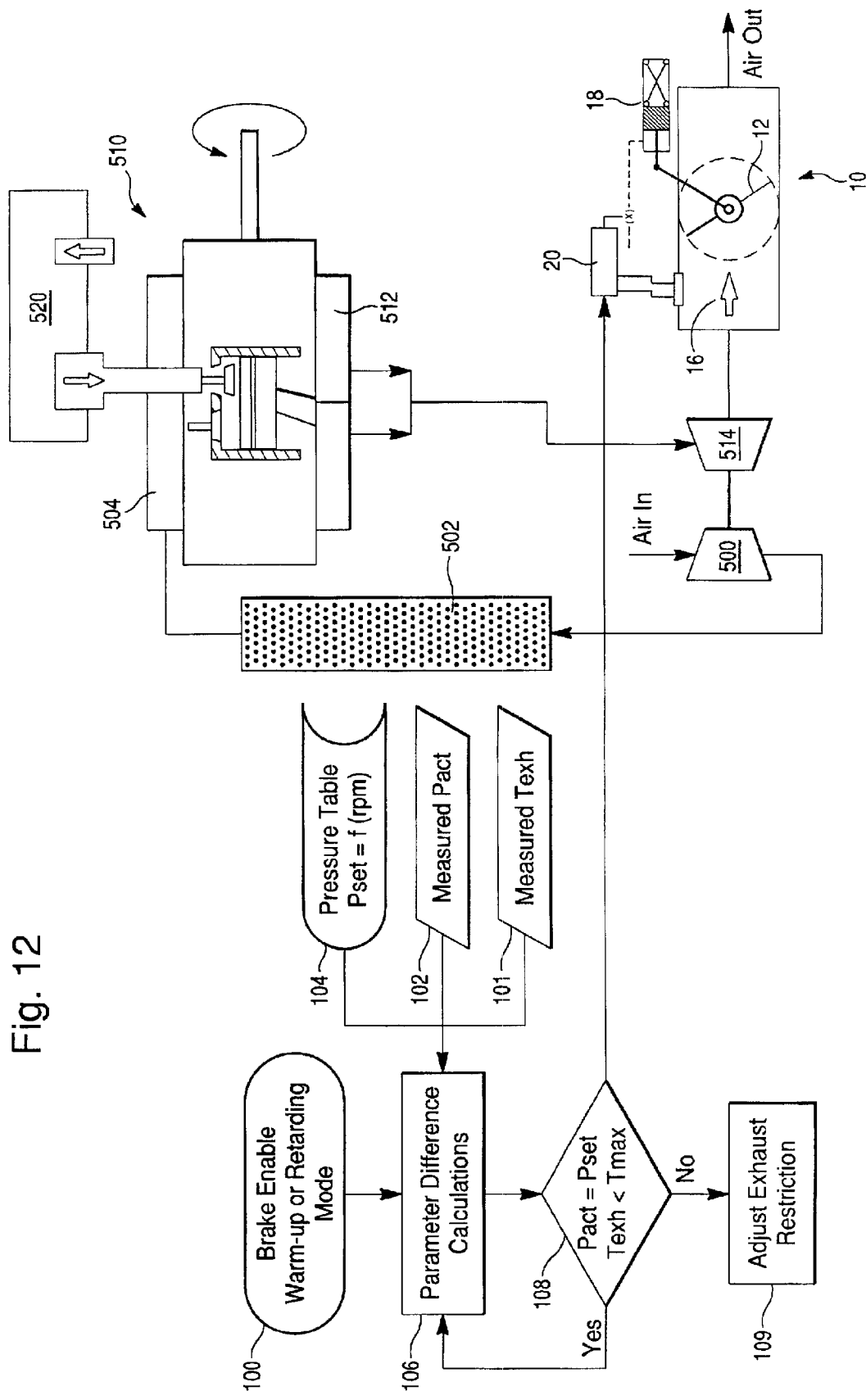
FIG. 12 is a schematic diagram of the controlled exhaust brake mounted downstream of both the turbine and compression release brake, and the exhaust pressure control process.

FIG. 12 is a schematic diagram of the first application of the present invention having compression release engine brake 520, as shown in FIG. 11, along with a schematic diagram of the exhaust control process outlined in FIG. 2.

Figure 13:
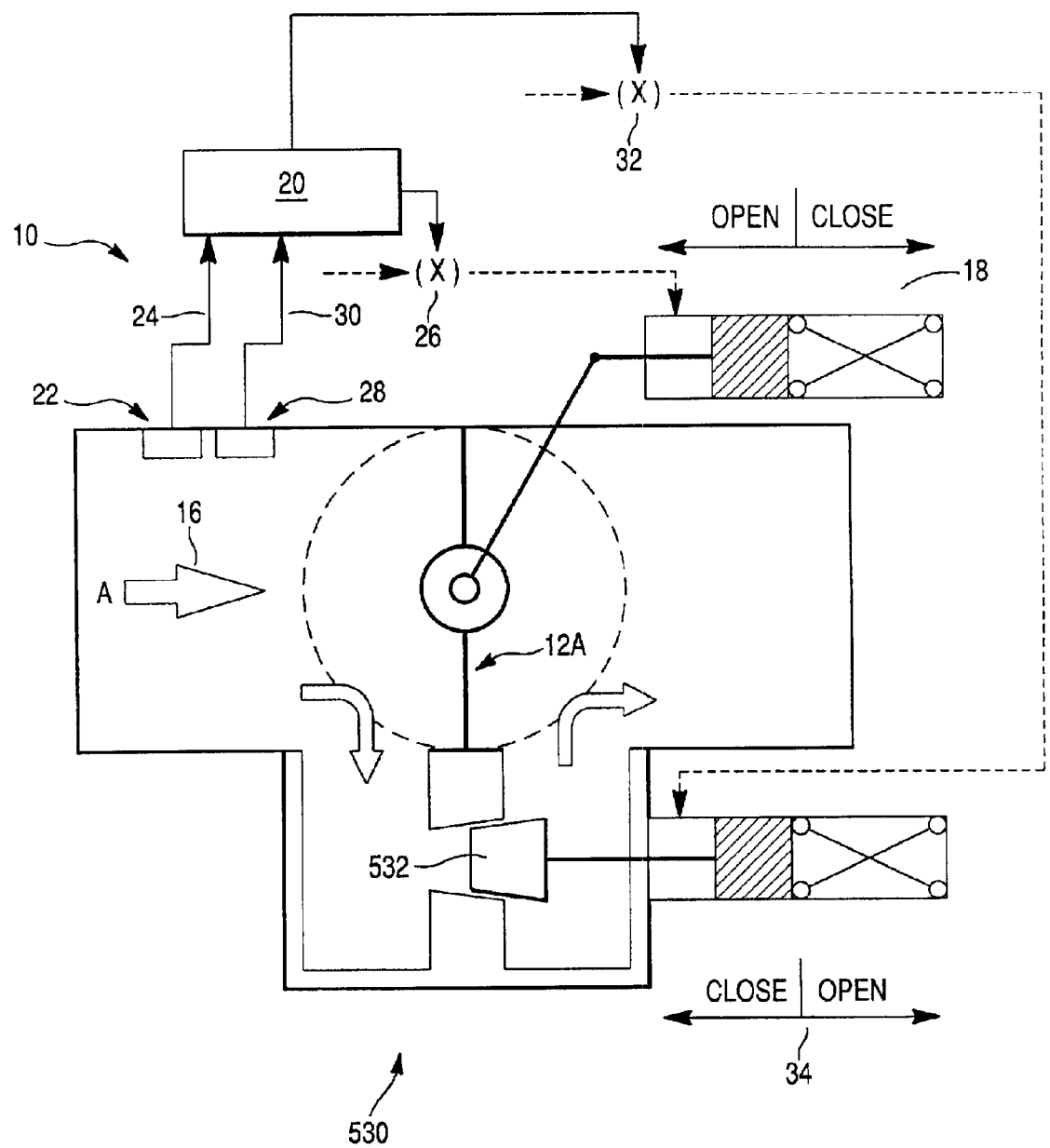
FIG. 13 is a schematic diagram of a controlled exhaust brake according to the present invention working in conjunction with a bypass valve.

A second application of the present invention is best shown in FIG. 13, wherein controlled exhaust brake 10 is working in conjunction with a bypass valve 530. Bypass valve 530 is used to adjust exhaust pressure and temperature. Controlled exhaust brake 10 includes a primary exhaust restrictor 12A, which is adjustable only to an ON position and an OFF position. Controller 20 causes actuator 18 to open or close primary exhaust restrictor 12A. Communication to actuator 18 by controller 20 may be modulated through solenoid valve 26. Controller 20 also controls a second solenoid valve 32 to modulate pressure signal 24 to a bypass actuator 34. Exhaust flow 16 is channeled into bypass valve 530. Controller 20 determines the temperature and pressure upstream of restrictor 12A based on temperature signal 30 and pressure signal 24. Controller 20 causes actuator 18 to close primary restrictor 12A, thereby channeling exhaust gas to bypass valve 530. Then, controller determines whether adjustment of bypass valve 530 is appropriate pursuant to the control algorithm process outlined above in FIG. 3. Controller 20 may then cause actuator 34 to adjust plunger 532 on bypass valve 530, thereby regulating pressure and temperature in the exhaust manifold 512. By-pass actuator 34 is moved an amount corresponding to an accumulated value determined by controller 20 using exhaust pressure control process outlined in FIG. 3. Thus, plunger 532 is adjusted the appropriate amount based on the determined accumulated value.

Figure 14:
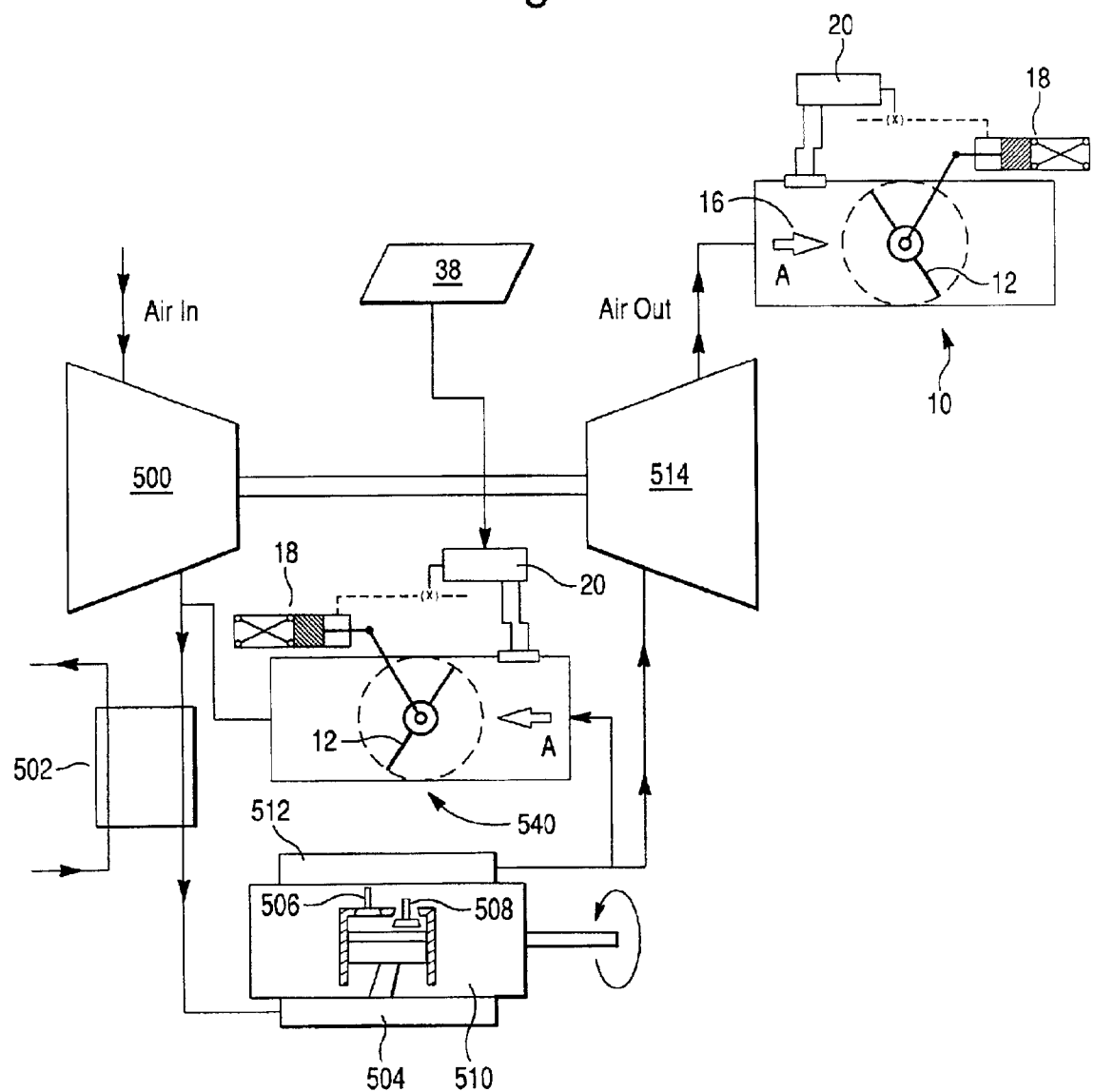
FIG. 14 is a schematic diagram of a controlled exhaust brake according to the present invention used as an exhaust gas recirculation valve.

As best shown in FIG. 14, in a third application of the present invention, controlled exhaust brake 10 functions as an exhaust gas recirculation (EGR) valve 540. Note that the structure of EGR valve 540 is identical to controlled exhaust brake 10, as explained above. EGR is a process used in positive-power mode of the engine to modify the combustion characteristics and emissions formation. Specifically, EGR valve 540 is mounted downstream of cylinder 510. Air is channeled from exhaust valve 508 into exhaust manifold 512, and channeled to turbine 514 as well as EGR valve 540, as best shown in FIG. 14. Exhaust flow 16 proceeding through turbine 514 may be channeled to a second controlled exhaust brake 10 in this application (wherein the first controlled exhaust brake functions as EGR valve 540). This second controlled exhaust brake 10 provides backpressure to drive exhaust gas to the EGR valve 540. Air is also channeled to EGR valve 540 from exhaust valve 508, instead of to turbine 514. Components of EGR valve 540 are identical to controlled exhaust brake 10 (as explained above). However, additional input may be provided to controller 20, in addition to temperature and pressure, from an engine control module 38. Input parameters from engine control module 38 may include engine speed and load (fuel). Such parameters are used for controlling nitrous oxide emissions, which are the primary emissions targeted to be improved with EGR. Engine control module 38 may provide mapped input for EGR demand from the valve.

It will be apparent to one of ordinary skill in the art that various modifications and variations can be made in construction or configuration of the present invention without departing from the scope or spirit of the invention. Thus, it is intended that the present invention cover the modifications and variations of the invention, provided they come within the scope of the following claims and their equivalents.

What is claimed is:

1. A controlled exhaust brake for an engine, comprising:
    an exhaust restrictor located in an exhaust system downstream of an exhaust manifold of an engine;
    an actuator operably associated with said restrictor for adjusting said restrictor;
    a pressure sensor operably associated with the exhaust manifold for sensing pressure in the exhaust manifold; and
    a controller for determining a set pressure in the exhaust manifold correlated with speed of the engine, said controller in communication with said pressure sensor and said actuator for causing adjustment of said restrictor in order to achieve and maintain the set pressure in the exhaust manifold.

2. The exhaust brake of claim 1, wherein said restrictor is selected from the group consisting of butterfly valves, gate valves, and variable geometry elements of a turbine of a variable geometry turbocharger.

3. The exhaust brake of claim 1, wherein said actuator is selected from the group consisting of air operated actuators, oil operated actuators, and electro-magnetic operated actuators.

4. The exhaust brake of claim 1, further comprising a control valve controlled by said controller, said control valve operably associated with said actuator for actuating said actuator and causing adjustment of said restrictor.

5. The exhaust brake of claim 4, wherein said control valve is a solenoid valve.

6. The exhaust brake of claim 1, wherein said controller determines the set pressure based on engine speed and an electronically stored table of values of set pressure.

7. The exhaust brake of claim 6, wherein said electronically stored table of values is correlated to engine speed.

8. The exhaust brake of claim 7, further comprising a temperature sensor operably associated with the exhaust manifold for sensing temperature in the exhaust manifold.

9. The exhaust brake of claim 8, wherein said controller is in communication with said temperature sensor for causing adjustment of said restrictor in order to maintain 'set temperature in the exhaust manifold.

10. The exhaust brake of claim 1, wherein said controller causes adjustment of said restrictor so that a controlled increase of pressure occurs for warming the engine after starting, wherein said controlled increase of pressure continues until a predetermined parameter value.

11. The exhaust brake of claim 1, wherein said actuator causes said restrictor to open so that the exhaust manifold is substantially unhindered by said restrictor if communication fails between said actuator and said controller.

12. A controlled exhaust brake for an engine, comprising:
an exhaust restrict or located in an exhaust system downstream of an exhaust manifold of an engine;
an actuator operably associated with said restrictor for adjusting said restrictor;
a pressure sensor operably associated with the exhaust manifold for sensing pressure in the exhaust manifold;
a temperature sensor operably associated with the exhaust manifold for sensing temperature in the exhaust manifold; and
a controller for determining a set pressure in the exhaust manifold correlated with speed of the engine, said controller in communication with said pressure sensor, said temperature sensor, and said actuator for causing adjustment of said restrictor in order to achieve and maintain the set pressure and the set temperature in the exhaust manifold.

13. The exhaust brake of claim 12, wherein said restrictor is selected from the group consisting of butterfly valves, gate valves, and variable geometry elements of a turbine of a variable geometry turbocharger.

14. The exhaust brake of claim 12, wherein said actuator is selected from the group consisting of air operated actuators, oil operated actuators, and electro-magnetic operated actuators.

15. The exhaust brake of claim 12, further comprising a control valve controlled by said controller, said control valve operably associated with said actuator for actuating said actuator and causing adjustment of said restrictor.

16. The exhaust brake of claim 15, wherein said control valve is a solenoid valve.

17. The exhaust brake of claim 12, wherein said controller determines the set pressure based on engine speed and an electronically stored table of values of set pressure.

18. The exhaust brake of claim 17, wherein said electronically stored table of values is correlated to engine speed.

19. The exhaust brake of claim 12, wherein said controller causes adjustment of said restrictor so that a controlled increase of pressure occurs for warming the engine after starting, wherein said controlled increase of pressure continues until a predetermined parameter value.

20. The exhaust brake of claim 12, wherein said actuator causes said restrictor to open so that the exhaust manifold is substantially unhindered by said restrictor if communication fails between said actuator and said controller.

21. A controlled exhaust brake for an engine, comprising:
a bypass valve operably associated with an exhaust manifold of an exhaust system of an engine;
an exhaust restrictor located in the exhaust system downstream of the exhaust manifold operably associated with said bypass valve;
a first actuator operably associated with said restrictor for opening or closing said restrictor so that when said restrictor is closed an exhaust flow is channeled to said bypass valve;
a second actuator operably associated with said bypass valve for adjusting said bypass valve;
a pressure sensor operably associated with the exhaust manifold for sensing pressure in the exhaust manifold;
a controller for determining a set pressure in the exhaust manifold correlated with speed of the engine, said controller in communication with said pressure sensor, said first actuator and said second actuator, said controller for causing said restrictor to close and for causing adjustment of said bypass valve in order to achieve and maintain the set pressure in the exhaust manifold.

22. The exhaust brake of claim 21, wherein said controller determines the set pressure based on engine speed and an electronically stored table of values of set pressure.

23. The exhaust brake of claim 22, wherein said electronically stored table of values is correlated to engine speed.

24. The exhaust brake of claim 21, further comprising a temperature sensor operably associated with the exhaust manifold for sensing temperature in the exhaust manifold.

25. The exhaust brake of claim 24, wherein said controller is in communication with said temperature sensor for causing adjustment of said bypass valve in order to maintain a set temperature.

26. The exhaust brake of claim 21, wherein said controller causes adjustment of said bypass valve so that a controlled increase of pressure occurs for warming the engine after starting, wherein said controlled increase of pressure continues until a predetermined parameter value.

27. The exhaust brake of claim 21, wherein said first actuator causes said restrictor to open so that the exhaust manifold is substantially unhindered by said restrictor if communication fails between said controller and said first or second actuators.

28. The exhaust brake of claim 21, wherein said restrictor is selected from the group consisting of butterfly valves, gate valves, and variable geometry elements in a turbine of a variable geometry turbocharger.

29. The exhaust brake of claim 21, wherein said first and second actuators are selected from the group consisting of air operated actuators, oil operated actuators, and electromagnetic operated actuators.

30. A method of regulating exhaust pressure in an engine comprising the steps of:
providing an exhaust restrictor located in an exhaust system downstream of an exhaust manifold of an engine;

sensing pressure in the exhaust manifold;

determining whether a maximum allowable pressure has been sensed in the exhaust manifold;

adjusting the restrictor until the pressure in the exhaust manifold is less than the maximum allowable pressure;

determining a set pressure in the exhaust manifold correlated with speed of the engine by a controller; and maintaining the set pressure in the exhaust manifold by causing adjustment of the restrictor by the controller.

31. The method of claim 30, including the step of retrieving the set pressure from an electronically stored table in the controller, wherein the set pressure is correlated to engine speed.

32. The method of claim 30, including the step of repeating said sensing, determining, and maintaining steps after a predetermined period of time has elapsed.

33. The method of claim 30, comprising the further steps of:

sensing temperature in the exhaust manifold; and maintaining a set temperature in the exhaust manifold by causing adjustment of the restrictor.

34. The method of claim 30, comprising the further step of mounting the exhaust restrictor in the exhaust system of an engine downstream of the exhaust manifold.

35. The method of claim 30, comprising the further step of mounting the exhaust restrictor downstream of a turbine in a turbocharged engine.

36. The method of claim 30, comprising the further step of mounting the exhaust restrictor upstream of a turbine in a turbocharged engine.

37. The method of claim 30, comprising the further step of mounting the exhaust restrictor downstream of a compression release brake in the exhaust system of an engine downstream of the exhaust manifold.

38. The method of claim 30, comprising the further step of mounting the exhaust restrictor downstream of the exhaust manifold in an engine so that exhaust flow recirculates into the exhaust system upstream of an intake manifold of the engine.

39. The method of claim 38, comprising the further step of providing a second exhaust restrictor mounted downstream of the first referenced exhaust restrictor so that exhaust flow is directed to the first referenced exhaust restrictor.

40. The method of claim 30, comprising the further step of mounting the exhaust restrictor downstream of the exhaust manifold in an engine so that exhaust flow recirculates into an intake manifold of the engine.

41. The method of claim 40, comprising the further step of providing a second exhaust restrictor mounted downstream of the first referenced exhaust restrictor so that exhaust flow is directed to the first referenced exhaust restrictor.

42. The method of claim 30, comprising the further step of controlling an increase of pressure in the exhaust manifold after starting the engine until a predetermined parameter value is reached for warming the engine after starting.

43. A method of regulating exhaust pressure in an exhaust manifold of an engine comprising the steps of:

providing an exhaust restrictor located in an exhaust system downstream of an exhaust manifold of an engine;

sensing pressure in the exhaust manifold;

determining whether a maximum allowable pressure has been sensed in the exhaust manifold;

opening the restrictor so that the exhaust manifold is substantially unhindered by the restrictor if the sensed pressure is greater than the maximum allowable pressure;

assigning a value to the sensed pressure if the sensed pressure is not equal to a set pressure; and adjusting the restrictor based on the assigned value.

44. The method of claim 43, comprising the further steps of:

sensing temperature in the exhaust manifold;

maintaining a set temperature in the exhaust manifold by causing adjustment of the restrictor.

45. The method of claim 44, including the step of causing adjustment of the restrictor by a controller.

46. The method of claim 45, including the step of retrieving the set pressure from an electronically stored table in the controller, wherein the set pressure is correlated to engine speed.

47. The method of claim 46, including the step of retrieving the set temperature from an electronically stored table in the controller.

48. The method of claim 43, including the steps of:

assigning a first value to the sensed pressure if the sensed pressure is less than the maximum allowable pressure by a first predetermined amount;

assigning a second value to the sensed pressure if the sensed pressure is greater than the set pressure by a second predetermined amount;

assigning a third value to the sensed pressure if a predetermined rate of increasing pressure change of the sensed pressure exceeds a predetermined parameter;

adding the first value, second value, and third value;

decreasing the added values by 5%, resulting in an accumulated value; and adjusting the restrictor if the accumulated value is greater than a predetermined value.

49. The method of claim 48, including the steps of:

assigning a fourth value to the sensed pressure if the sensed pressure is about zero;

assigning a fifth value to the sensed pressure if the sensed pressure is less than the set pressure by the second predetermined amount;

assigning a sixth value to the sensed pressure if a predetermined rate of decreasing pressure change of the sensed pressure exceeds the predetermined parameter;

adding the fourth value, fifth value, and sixth value;

decreasing the added values by 5%, resulting in an accumulated value; and adjusting the restrictor if the accumulated value is greater than a predetermined value.

50. The method of claim 43, including the step of repeating said sensing, assigning and adjusting steps after a predetermined amount of time.

* * * * *